(12) United States Patent
Priest et al.

(10) Patent No.: US 10,456,906 B2
(45) Date of Patent: Oct. 29, 2019

(54) MECHANICAL TOWER CLIMBER FOR OPERATIONS ON CELL TOWERS

(71) Applicant: ETAK Systems, LLC, Huntersville, NC (US)

(72) Inventors: Lee Priest, Charlotte, NC (US);
Charlie Terry, Charlotte, NC (US);
Joshua Godwin, Charlotte, NC (US);
Richard Murphy, Charlotte, NC (US);
Jordan Bates, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 238 days.

(21) Appl. No.: 15/692,204

(22) Filed: Aug. 31, 2017

(65) Prior Publication Data
US 2018/0009102 A1 Jan. 11, 2018

Related U.S. Application Data

(63) Continuation-in-part of application No. 15/235,686, filed on Aug. 12, 2016, now Pat. No. 10,150,661, and
(Continued)

(51) Int. Cl.
*B25J 5/00* (2006.01)
*B25J 19/02* (2006.01)
(Continued)

(52) U.S. Cl.
CPC .............. *B25J 5/007* (2013.01); *B25J 11/005* (2013.01); *B25J 15/0009* (2013.01); *B25J 19/023* (2013.01); *H04B 17/318* (2015.01)

(58) Field of Classification Search
CPC ...... B25J 5/007; B25J 13/006; B25J 15/0009; B25J 11/005; B25J 19/023; H04B 17/318
(Continued)

(56) References Cited

U.S. PATENT DOCUMENTS 4,793,439 A * 12/1988 Crawford ............... A63B 27/00
182/136
5,542,496 A * 8/1996 St. Denis ........... A01G 23/0955
182/133
(Continued)

OTHER PUBLICATIONS

Sahedi et al, Analysis, simulation, and implementation of a human-inspired pole climbing robot, 2011, Robotica (2012) vol. 30, pp. 279-287. © Cambridge University Press 2011, doi:10.1017/50263574711000579 (Year: 2011).*
(Continued)

*Primary Examiner* — Jaime Figueroa
(74) *Attorney, Agent, or Firm* — Clements Bernard Walker PLLC; Lawrence A. Baratta, Jr.

(57) ABSTRACT

A mechanical tower climber system for performing operations on a cell tower includes a body; a plurality of members disposed or connected to the body and each comprising one or more robotic hands; and a wireless interface and a processing device configured to receive commands from a remote operator; climb the cell tower based on the commands; and perform one or more operations on cell site components associated with the cell tower based on the commands and manipulation of the plurality of members and associated one or more robotic hands.

13 Claims, 10 Drawing Sheets

Related U.S. Application Data a continuation-in-part of application No. 15/205,313, filed on Jul. 8, 2016, now Pat. No. 10,384,804.

(51) Int. Cl.
*B25J 15/00* (2006.01)
*B25J 11/00* (2006.01)
*H04B 17/318* (2015.01)

(58) Field of Classification Search
USPC .......................................................... 700/245
See application file for complete search history.

(56) References Cited

U.S. PATENT DOCUMENTS

| | | | | |
|---|---|---|---|---|
| 7,422,041 | B2* | 9/2008 | Smith | A01G 23/0955 144/208.2 |
| 8,171,809 | B2* | 5/2012 | Fritz | G01M 11/081 73/865.8 |
| 8,201,787 | B2* | 6/2012 | Ingram | F03D 80/50 248/218.4 |
| 8,281,442 | B2* | 10/2012 | Eggleston | B08B 1/02 15/21.1 |
| 9,205,554 | B2* | 12/2015 | Hayden | A01G 23/0955 |
| 9,327,784 | B2* | 5/2016 | Bagheri | E04G 3/243 |
| 9,863,919 | B2* | 1/2018 | Carrasco Zanini | G01D 5/00 |
| 10,220,897 | B2* | 3/2019 | Takanishi | B62D 57/032 |
| 2007/0181217 | A1* | 8/2007 | Ahdoot | A01G 23/0955 144/208.2 |
| 2007/0235238 | A1* | 10/2007 | Sadegh | B62D 49/0621 180/164 |
| 2011/0100734 | A1* | 5/2011 | Fauroux | A63B 27/00 180/8.7 |
| 2013/0248679 | A1* | 9/2013 | Hayden | A01G 23/0955 248/682 |
| 2016/0159420 | A1* | 6/2016 | Ward | B62D 57/02 180/8.6 |

OTHER PUBLICATIONS

Tadakuma et al, Mechanical Design of the Wheel-Leg Hybrid Mobile Robot to Realize a Large Wheel Diameter, 2010 IEEE/RSJ International Conference on Intelligent Robots and Systems, Oct. 18-22, 2010, Taipei, Taiwan, pp. 3358-3365 (Year: 2010).*

Lucian Cucu, Towards Self-Assembled Structures with Mobile Climbing Robots, Aug. 2014, Harvard University, Master Thesis Microengineering, pp. 1-90 (Year: 2014).*

Baghani et al, Kinematics Modeling of a Wheel-Based Pole Climbing Robot (UT-PCR), Apr. 2005, Proceedings of the 2005 IEEE International Conference on Robotics and Automation, Barcelona, Spain, pp. 2099-2104 (Year: 2005).*

Tavakoli et al, 3DCLIMBER: A climbing robot for inspection of 3D human made structures, Oct. 2008, IROS 2008. IEEE/RSJ International Conference on Intelligent Robots and Systems, pp. 1-9 (Year: 2008).*

Yoon et al, Shady3D: A Robot that Climbs 3D Trusses, 2007 IEEE International Conference on Robotics and Automation, Roma, Italy, Apr. 10-14, 2007, pp. 4071-4076 (Year: 2007).*

Balaguer et al, A climbing autonomous robot for inspection applications in 3D complex environments, Robotica (2000) vol. 18, Printed in the United Kingdom © 2000 Cambridge University Press, pp. 287-297 (Year: 2000).*

\* cited by examiner

MECHANICAL TOWER CLIMBER FOR OPERATIONS ON CELL TOWERS

CROSS-REFERENCE TO RELATED APPLICATION(S)

The present patent/application is continuation-in-part of, and the content of each is incorporated by reference herein:

| Filing Date | Ser. No. | Title |
|---|---|---|
| Aug. 12, 2016 | 15/235,686 | TELESCOPING PLATFORM FOR OPERATIONS ON CELL TOWERS |
| Jul. 8, 2016 | 15/205,313 | CELL TOWER INSTALLATION AND MAINTENANCE SYSTEMS AND METHODS USING ROBOTIC DEVICES |

FIELD OF THE DISCLOSURE

The present disclosure generally relates to cell site and tower systems and methods. More particularly, the present disclosure relates to a mechanical tower climber system and method for operations on cell towers that offers safety.

BACKGROUND OF THE DISCLOSURE

Due to the geographic coverage nature of wireless service, there are hundreds of thousands of cell towers in the United States. For example, in 2014, it was estimated that there were more than 310,000 cell towers in the United States. Cell towers can have heights up to 1,500 feet or more. There are various requirements for cell site workers (also referred to as tower climbers or transmission tower workers) to climb cell towers to perform maintenance, audit, and repair work for cellular phone and other wireless communications companies. This is both a dangerous and costly endeavor. For example, between 2003 and 2011, 50 tower climbers died working on cell sites (see, e.g., wwww.pbs.org/wgbh/pages/frontline/social-issues/cell-tower-deaths/in-race-for-better-cell-service-men-who-climb-towers-pay-with-their-lives/). Also, OSHA estimates that working on cell sites is 10 times more dangerous than construction work, generally (see, e.g., www.propublica.org/articlel/cell-tower-work-fatalities-methodology). Furthermore, the tower climbs also can lead to service disruptions caused by accidents. Thus, there is a strong desire, from both a cost and safety perspective, to reduce the number of tower climbs.

It would be advantageous to have a mechanism to allow cell site workers to reach up to a cell tower, without having to perform a dangerous tower climb. Any such mechanism requires safety, stability, accessibility, mobility, etc.

BRIEF SUMMARY OF THE DISCLOSURE

In an exemplary embodiment, a mechanical tower climber system for performing operations on a cell tower includes a body; a plurality of members disposed or connected to the body and each comprising one or more robotic hands; and a wireless interface and a processing device configured to receive commands from a remote operator; climb the cell tower based on the commands; and perform one or more operations on cell site components associated with the cell tower based on the commands and manipulation of the plurality of members and associated one or more robotic hands. The mechanical tower climber system can further include one or more wheels configured to move up and down the cell tower. The cell tower can include one of a monopole tower, a self-support tower, and a guyed tower. The plurality of members can be configured to mimic a human or spider to climb the cell tower. The mechanical tower climber system can further include a safety clip configured to clip into safety wires on the cell tower. The mechanical tower climber system can further include one or more cameras connected to the wireless interface and the processing device and configured to provide a real-time feed to the remote operator.

The associated one or more robotic hands can be configured to perform torquing tasks on the cell tower. The mechanical tower climber system can further include a spectrum analyzer configured to perform Radio Frequency (RF) measurements. The associated one or more robotic hands can include robotic digits which mimic human hands. One or more of the robotic digits can have tools integrated therein. The remote operator can control the mechanical tower climber system via commands sent to the wireless interface from sensory gloves. The plurality of members can be configured to retract and expand. The mechanical tower climber system can further include one or more selectively engageable magnets disposed on the body and/or the plurality of members.

In another exemplary embodiment, a mechanical tower climber method for performing operations on a cell tower includes providing a body; providing a plurality of members disposed or connected to the body and each comprising one or more robotic hands; and providing a wireless interface and a processing device configured to receive commands from a remote operator; climb the cell tower based on the commands; and perform one or more operations on cell site components associated with the cell tower based on the commands and manipulation of the plurality of members and associated one or more robotic hands.

In an exemplary embodiment, a telescoping platform system for providing workers and/or equipment up a cell tower includes a telescoping pole adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform. The telescoping pole can include N sections each with a length M to provide an extension of the platform to a height of about N×M, wherein N and M are selected based on the one of a bed and a trailer and a desired height for the cell tower. The telescoping pole and the platform can be configured in a transport position substantially horizontal and an operating position substantially vertical. The workers enter and exit the platform in an initial operating position and the equipment is placed in the platform in the transport position. The workers can be secured to the platform via a safety harness.

The plurality of support connections can include one or more of tethers, clips, straps, arms, and robotic arms. The robotic arms, clips, and arms can be automatically attached to the cell tower as the telescoping pole is selectively extended. The clips, tethers, arms, and straps can be manually attached to the cell tower by one of the workers as the telescoping pole is selectively extended. The cell tower can include one of a monopole tower and a guyed tower with the plurality of support connections attached thereto. The telescoping platform system can further include a mobile unit comprising one of a trailer and a bed for transporting the telescoping pole and the platform attached thereto in a transport position. The extension mechanism can be further configured to rotate the telescoping pole and the platform attached thereto about ninety degrees between a transport position and an operating position. The telescoping pole can include a plurality of sections with a climbing mechanism attached to a first section allowing the workers to enter the platform once the operating position is achieved. The platform can include a securing mechanism to hold the equipment in the transport position.

In another exemplary embodiment, a mobile unit with a telescoping platform for providing workers and/or equipment up a cell tower includes one of a bed and a trailer; a telescoping pole on the one of the bed and the trailer, wherein the telescoping pole is adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform. The telescoping pole can include N sections each with a length M to provide an extension of the platform to a height of about N×M, wherein N and M are selected based on the one of the bed and the trailer and a desired height for the cell tower. The extension mechanism can be further configured to rotate the telescoping pole and the platform attached thereto about ninety degrees between a transport position and an operating position. The telescoping pole can include a plurality of sections with a climbing mechanism attached to a first section allowing the workers to enter the platform once the operating position is achieved. The platform can include a securing mechanism to hold the equipment in the transport position.

In a further exemplary embodiment, a method of performing operations on a cell tower with a telescoping platform includes positioning a telescoping platform system proximate to the cell tower, wherein the telescoping platform includes a telescoping pole adapted to selectively extend vertically via an extension mechanism; a platform disposed to a top of the telescoping pole and adapted to support one or more workers and/or equipment for the cell tower; and a plurality of support connections to attach the telescoping pole while it is selectively extended to the cell tower to provide horizontal support to the telescoping pole and the platform; selectively extending the telescoping pole with one or more a worker, workers, and equipment therein; and selectively engaging the plurality of support connections to the cell tower during the selectively extending. The telescoping pole can include N sections each with a length M to provide an extension of the platform to a height of about N×M, wherein N and M are selected based on the one of the bed and the trailer and a desired height for the cell tower.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, the present disclosure relates to a mechanical tower climber system and method for operations on cell towers that offers safety. The mechanical tower climber system can scale telecommunications towers to perform maintenance work or the like with the objective of minimizing manual tower climbs. The mechanical tower climber system can support climbs on any type of cell tower, e.g., monopole, self-support, guyed, etc. The mechanical tower climber system can include a camera and robotic arms which can be remotely controlled by an operator either on the ground or remote from the cell site.

Also, in various exemplary embodiments, the present disclosure relates to telescoping platform systems and methods for operations on cell towers. Specifically, the systems and methods include a telescoping platform, a mobile unit with the telescoping platform, and an associated method of use. The telescoping platform can include space for a few workers (e.g., 1-3) along with optional cargo (e.g., antennas or other equipment for the cell tower). The telescoping platform can be configured to raise/lower vertically up several hundred feet to provide a safe means of reaching cell site components on the cell tower. In an exemplary embodiment, the telescoping platform is used with monopole cell towers and guyed cell towers, i.e., towers with a substantially cylindrical based. Further, to improve safety and provide support, the telescoping platform is configured to attach or connect to the cell tower at various intervals while raising. Thus, once at the desired height, the telescoping platform maintains horizontal stability along with vertical stability. The mobile unit allows the telescoping platform to be used at various different cell sites. Advantageously, the telescoping platform enables cell site workers to reach up to the cell tower in a few minutes instead of a dangerous and timely tower climb which could take over an hour and does not allow equipment to be transported with the workers.

§ 1.0 Exemplary Cell Site

Figure 11A:
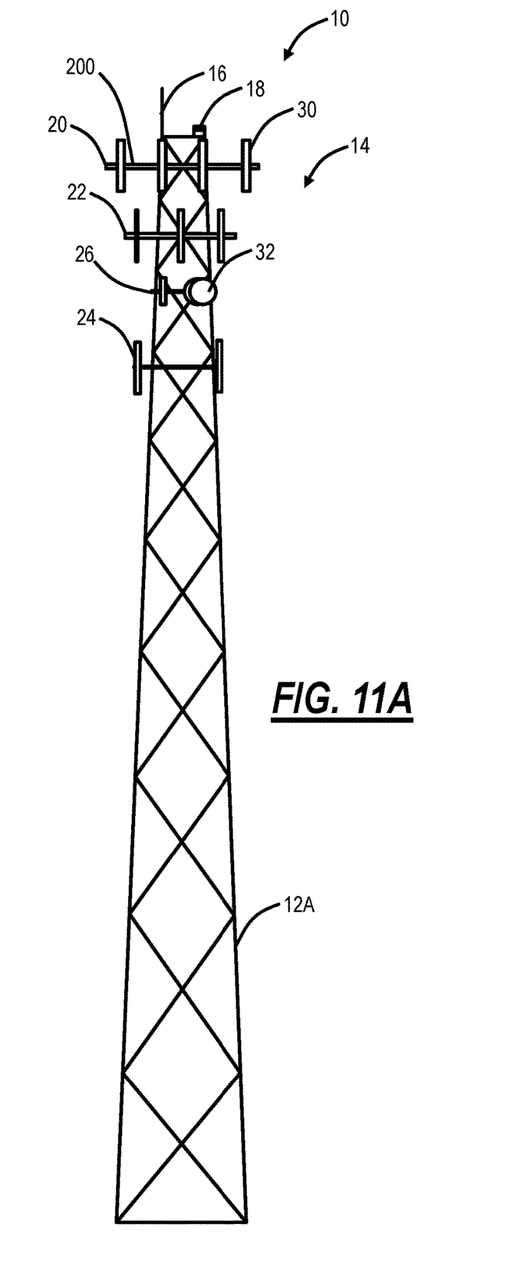
FIGS. 11A-11C are diagrams of different types of cell towers, namely a self-support tower (FIG. 11A), a monopole tower (FIG. 11B), and a guyed tower (FIG. 11C)
Figure 11B:
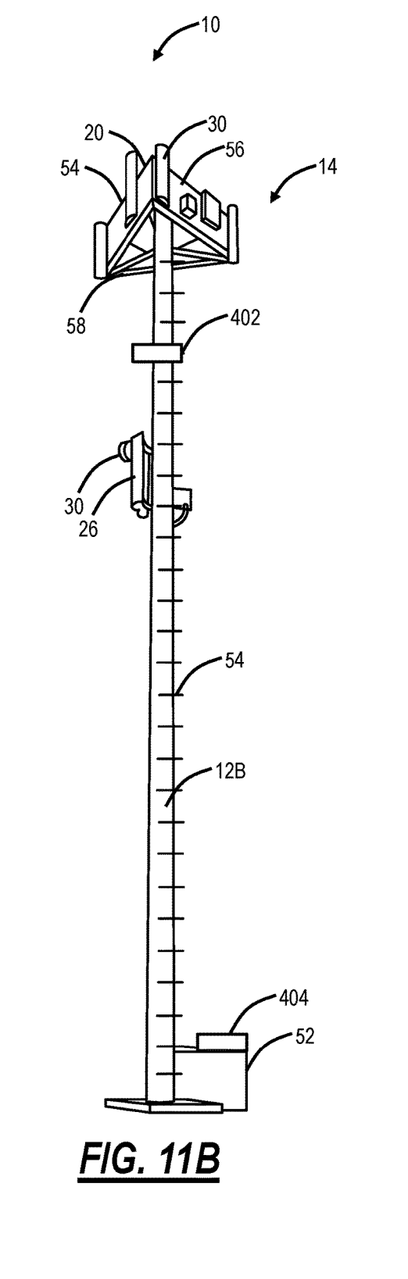
Figure 11C:
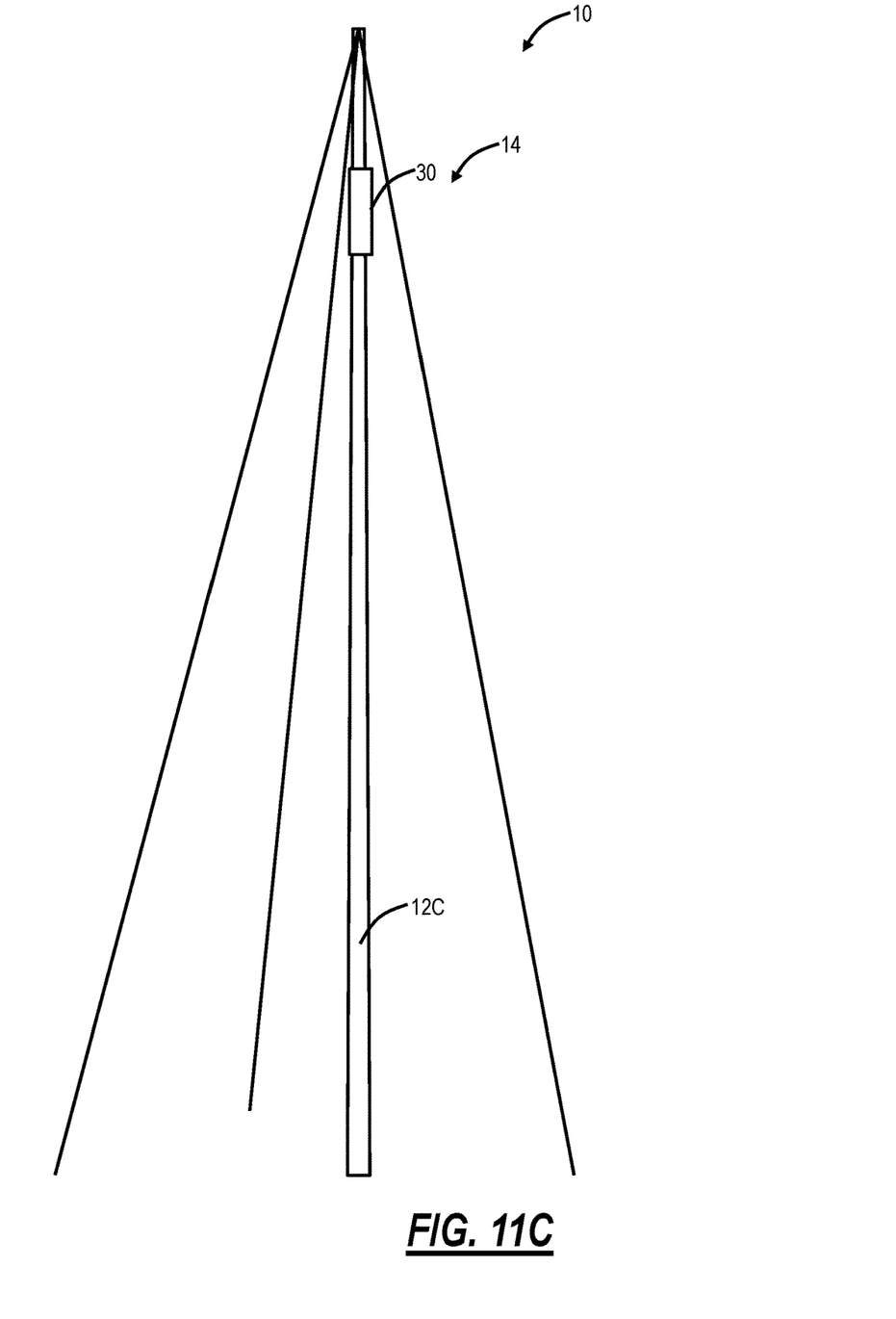

Referring to FIGS. 1, 2, 11A, 11B, and 11C, in an exemplary embodiment, the diagrams illustrate a side view of an exemplary cell site 10 with a monopole cell tower 12 (FIG. 1), a guyed cell tower 12B (FIG. 2), a self-support tower 12A (FIG. 11A), a monopole tower 12B (FIG. 11B), and a guyed tower 12C (FIG. 11c). The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lightning rod 16, a warning light 18, etc. Of course, there may be various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g., there can be three sectors for the cell site components alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

Figure 1:
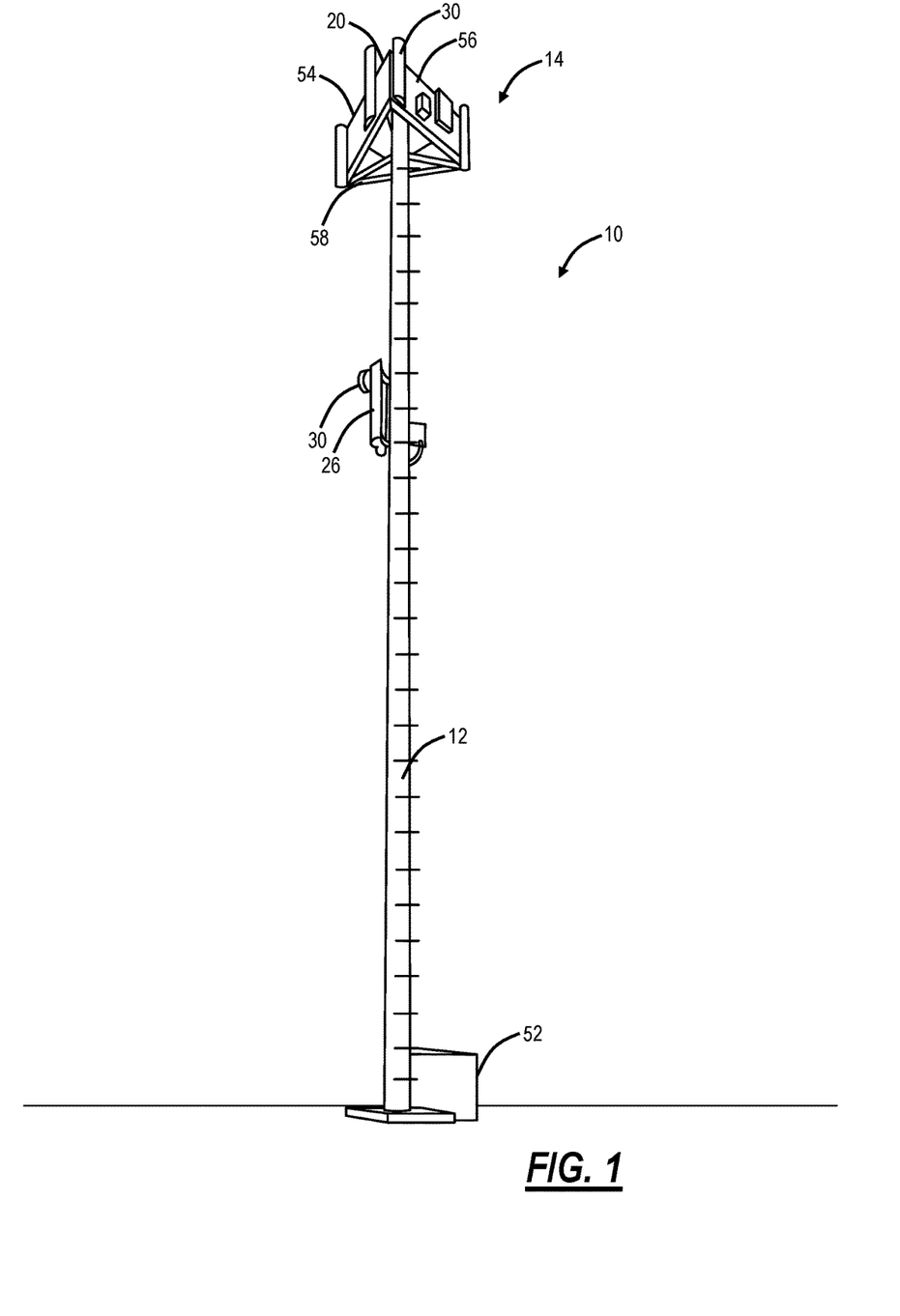
FIGS. 1 and 2 are diagrams of a side view of an exemplary cell site 10 with a monopole cell tower (FIG. 1) and a guyed cell tower (FIG. 2)

To support the various cell site components and their operation thereof, the cell site 10 includes a shelter 50 (which can also be referred to as a cabinet, house, etc.) which include electronics and other networking equipment to support the functionality and operation. In the example of FIG. 1, the cell tower 12A is a monopole tower which includes a cylindrical base that is free standing to support the cell site components 14. The monopole cell tower 12A can include climbing supports along with pegs, clips, etc. for safely securing a climber.

Figure 2:
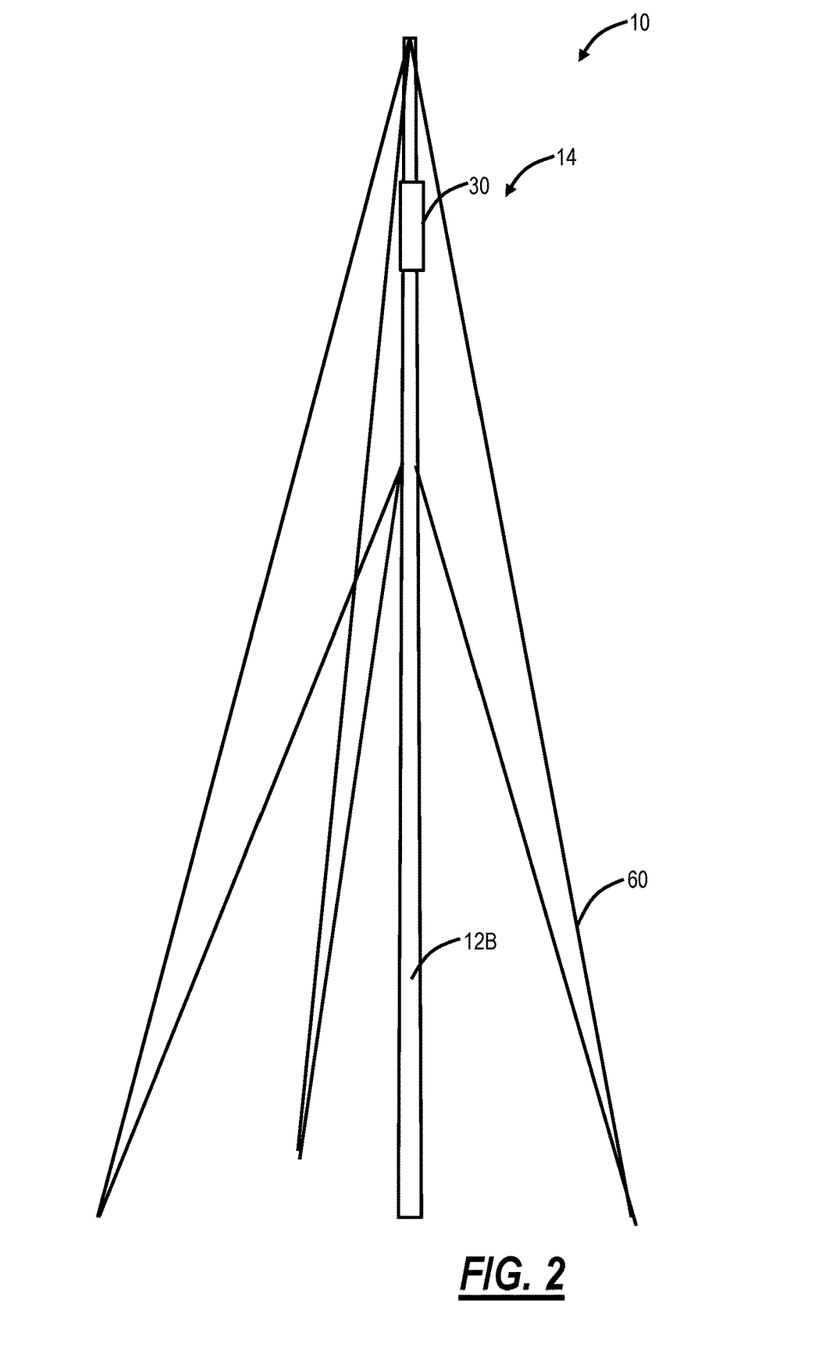

In the example of FIG. 2, the cell tower 12B is a guyed tower 12B which is a straight rod supported by guide wires 60 attached to the ground. The guide wires 60 generally attach to the straight rod at the same place at different heights on the straight rod, e.g., every 100', 200', etc. Similar to the monopole cell tower 12A, the guyed tower 12B can include climbing supports along with pegs, clips, etc. for safely securing a climber.

§ 1.1 Cell Site Audits

As described herein, a cell site audit is used by service providers, third party engineering companies, tower operators, etc. to check and ensure proper installation, maintenance, and operation of the cell site components 14 and shelter or cabinet 52 equipment as well as the various interconnections between them. From a physical accessibility perspective, the cell tower 12 includes a climbing mechanism for tower climbers to access the cell site components 14. The systems and methods described herein eliminate a need for the engineer/technician to climb the cell tower 12. Of note, it is still important for the engineer/technician to be local to the cell site 10 as various aspects of the cell site audit cannot be done remotely as described herein.

In general, the cell site audit 40 is performed to gather information and identify a state of the cell site 10. This is used to check the installation, maintenance, and/or operation of the cell site 10. Various aspects of the cell site audit can include, without limitation:

Verify the cell site 10 is built according to a current revision
Verify Equipment Labeling
Verify Coax Cable ("Coax") Bend Radius
Verify Coax Color Coding/Tagging
Check for Coax External Kinks & Dents
Verify Coax Ground Kits
Verify Coax Hanger/Support
Verify Coax Jumpers
Verify Coax Size
Check for Connector Stress & Distortion
Check for Connector Weatherproofing
Verify Correct Duplexers/Diplexers Installed
Verify Duplexer/Diplexer Mounting
Verify Duplexers/Diplexers Installed Correctly
Verify Fiber Paper
Verify Lacing & Tie Wraps
Check for Loose or Cross-Threaded Coax Connectors
Verify Return ("Ret") Cables
Verify Ret Connectors
Verify Ret Grounding
Verify Ret Installation
Verify Ret Lightning Protection Unit (LPI)
Check for Shelter/Cabinet Penetrations
Verify Surge Arrestor Installation/Grounding
Verify Site Cleanliness
Verify LTE GPS Antenna Installation Of note, the cell site audit 40 includes gathering information at and inside the shelter or cabinet 52, on the cell tower 12, and at the cell site components 14.

§ 2.0 Telescoping Platform

Figure 3:
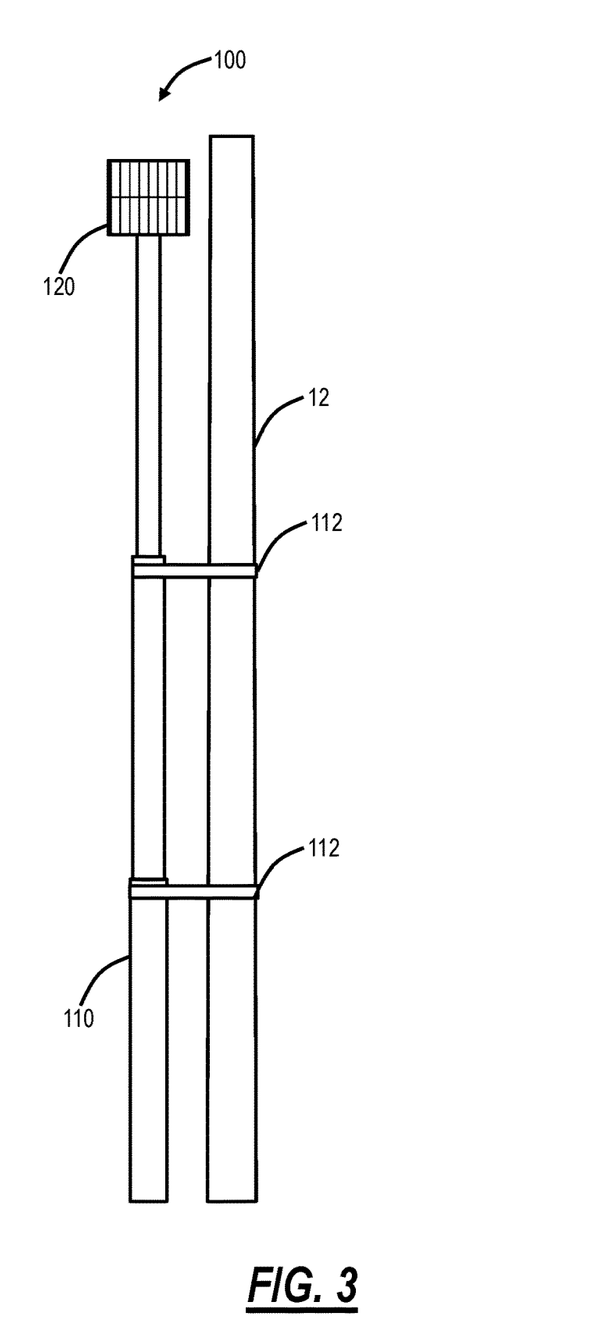
FIG. 3 is a perspective diagram of the telescoping platform extended and secured to the cell tower of FIG. 1 or 2.
Figure 4:
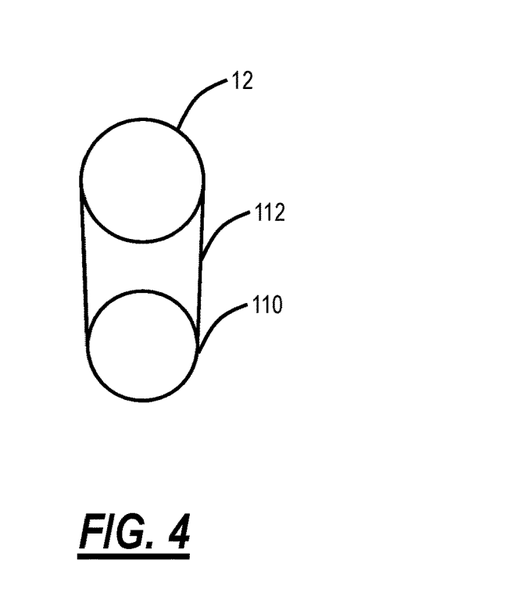
FIG. 4 is a cross-sectional view of a telescoping pole connected to the cell tower of FIG. 1 or 2 with support connections.
Figure 5:
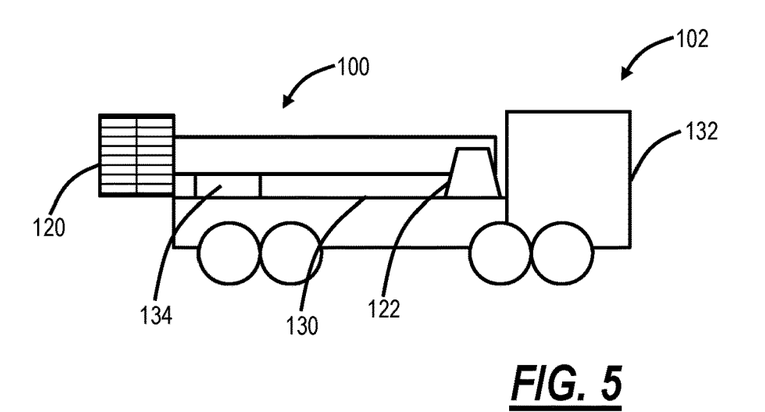
FIG. 5 is a perspective diagram of the mobile unit with the telescoping platform in a transport position.
Figure 6:
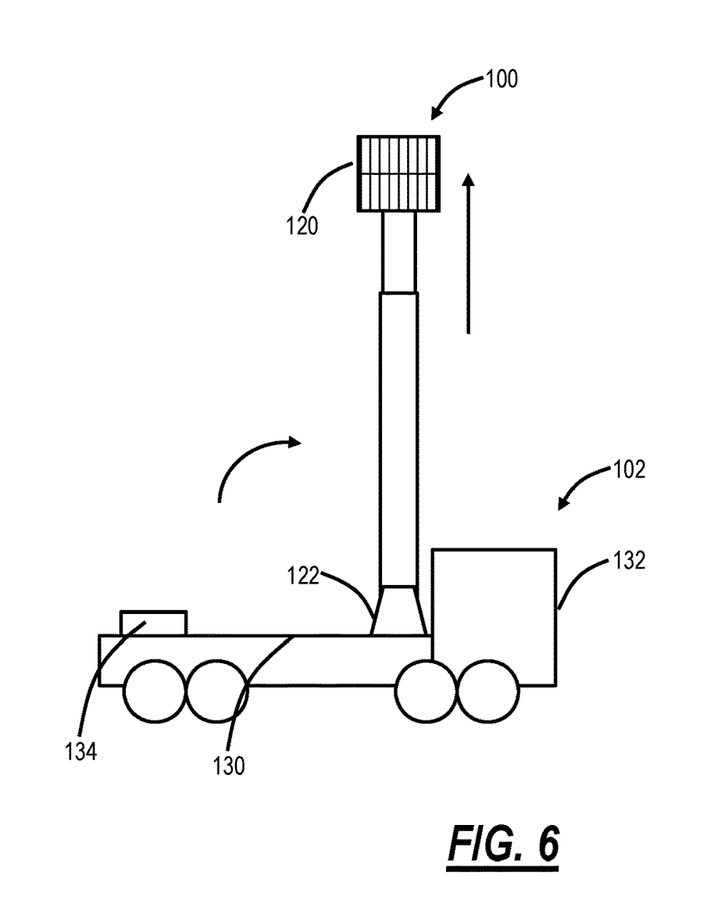
FIG. 6 is a perspective diagram of the mobile unit with the telescoping platform in the process of raising in an operating position.
Figure 7:
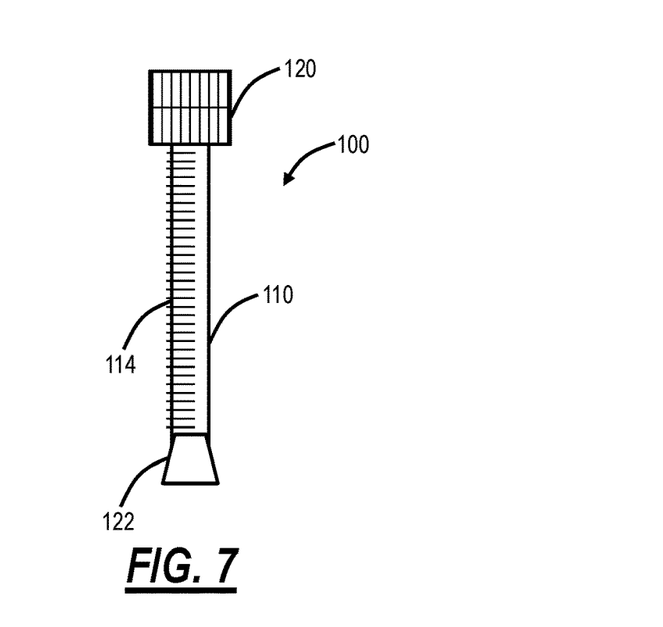
FIG. 7 is a perspective diagram of the telescoping platform illustrating a ladder on a first section of the telescoping pole allowing workers to reach a platform on top of the telescoping pole.
Figure 8:
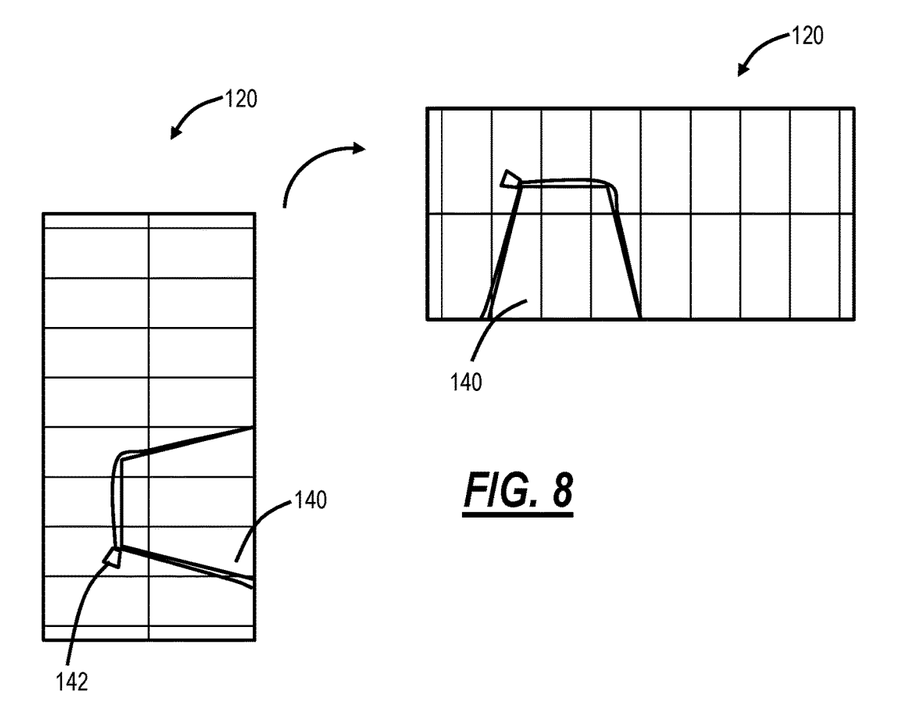
FIG. 8 is a perspective view of the platform illustrating equipment placed and secured therein in the transport position and moved to the operating position.

Referring to FIGS. 3-8, in an exemplary embodiment, various diagrams illustrate a telescoping platform 100 and a mobile unit 102 for the telescoping platform 100. FIG. 3 is a perspective diagram of the telescoping platform 100 extended and secured to the cell tower 12. FIG. 4 is a cross-sectional view of a telescoping pole 110 (i.e., a mast) connected to the cell tower 12 with support connections 112. FIG. 5 is a perspective diagram of the mobile unit 102 with the telescoping platform 100 in a transport position. FIG. 6 is a perspective diagram of the mobile unit 102 with the telescoping platform 100 in the process of raising in an operating position. FIG. 7 is a perspective diagram of the telescoping platform 100 illustrating a ladder 114 or some other climbing mechanism (e.g., steps, pegs, etc.) on a first section of the telescoping pole 110 allowing workers to reach a platform 120 on top of the telescoping pole 110. FIG. 8 is a perspective view of the platform 120 illustrating equipment 116 placed and secured therein in the transport position and moved to the operating position.

In FIG. 3, the telescoping platform 100 is shown extended to a desired position relative to the cell tower 12, a location where the cell site components 14 being worked on are located. The platform 120 is configured to support one to three workers along with optional equipment. The workers' safety is maintained as the workers do not climb the tower 12 but rather are lifted vertically via the platform 120 and the telescoping pole 110. The workers can also clip onto safety harnesses located in the platform 120 for additional safety.

The telescoping pole 110 can extend a couple hundred feet to support heights up to the top of the cell tower 12. The telescoping pole 110 is extended by an extension mechanism 122 which can include any mechanical technique to raise/lower the telescoping pole 110, such as a motor, a hydraulic motor, an electric motor, a gas-powered motor, various gears, etc. It is expected that, with three workers and equipment, the platform 120 can be raised to the top of the cell tower 12 over several minutes which is a significant improvement from a tower climb which could take an hour.

One particular problem with the platform 120 being a couple hundred feet in the air vertically proximate to the cell tower 12 is horizontal drift. Specifically, the platform 120 at, for example, 200' is unsafe and risks toppling over as the workers shift and move on the platform 120. Thus, to provide stability, the telescoping pole 110 is configured to attach or connect to the cell tower 12 at various locations via the support connections 112. The support connections 112 can be tethers, clips, straps, arms, robotic arms, etc. that are configured to connect to the cell tower 12 to provide support for the telescoping pole 110.

The support connections 112 are attached, either automatically for the robotic arms, clips, arms, or manually with the workers for clips, tethers, arms, straps, etc. The support connections 112 are attached as the telescoping pole 110 extends. In an exemplary embodiment, the support connections 112 are attached at various heights along the cell tower 12, such as every 10', 20', 30', etc.

As shown in FIG. 4, in an exemplary embodiment, the support connections 112 wraps around the entire pole of the cell tower 12, which is why the telescoping platform 100 operates with the cell towers 12A, 12B (instead of a lattice tower). In another exemplary embodiment, the support connections 112 clip on, i.e., do not extend around the circumference of the pole of the cell tower 12 to provide horizontal stability. In a further exemplary embodiment, the support connections 112 connect to pegs, clips, poles, etc. on the cell tower 12, such as those used for safely connecting workers during a tower climb.

On the descent of the telescoping pole 110, the support connections 112 are disconnected/removed as the telescoping pole 110 is lowered. Thus, the support connections 112 are temporary supports ensuring the platform 120 does not sway, topple, or move during operations on the cell tower 12.

In FIGS. 5 and 6, the mobile unit 102 is illustrated with the telescoping platform 100 integrated on a bed 130 of a truck or the like. The truck can be a flat bed, semitrailer, or full trailer. The mobile unit 102 includes a cab 132 for a driver and an engine or the like. The bed 130 is attached or connected to the cab 132. In the transport position, the telescoping platform 100 can be tens of feet, capable of being transported on roads and highways and can be supported by a support 134 located on the bed 130. The telescoping pole 110 can be locked to the support 134 in the transport position.

The telescoping pole 110 includes N sections each of M feet, thereby supporting heights of N×M. In an exemplary embodiment, each section is 20' and there are ten sections for 200' height. Other embodiments are also contemplated. The size of the M feet can be based on the mobile unit 102 and considerations associated with transport on road and highways.

Alternatively, the telescoping platform 100 can be part of a trailer which is hitched to another vehicle. In yet another exemplary embodiment, the telescoping platform 100 can be mobile itself with wheels and propulsion. In a further exemplary embodiment, the telescoping platform 100 can be part of or made with a crane. Various other embodiments are also contemplated.

The mobile unit 102 in FIG. 5 is configured to drive on roads, highways, gravel, etc. to bring the telescoping platform 100 to a location proximate to the cell tower. Once the mobile unit 102 is positioned proximate to the cell tower 12, the telescoping platform 100 is configured to deploy as shown in FIG. 6.

To deploy the telescoping platform 100 from the transport position to the operating position. First, the telescoping pole 110 is unlocked from the support 134. Next, the telescoping pole 110 with the platform 120 is raised from a lateral, horizontal position to a vertical position. This movement can be through the extension mechanism 122. Specifically, the extension mechanism 122 can rotate the telescoping platform 100 about ninety degrees from the transport position to the operating position as well as extend each of the N sections of the telescoping pole 110 vertically to raise or lower the platform 120.

FIG. 7 illustrates the telescoping pole 110 once raised from the transport position to the operating position. Note, in the transport position, the platform 120 is vertical, unable to support workers therein. The workers can enter and exit the platform 120 once the telescoping platform is initially raised from the transport position to the operating position, such as via the ladder 114. Of note, the workers here are only climbing M feet, e.g., 20' which generally does not have the same safety concerns as climbing a 200' cell tower 12.

The platform 120 can include a lockable door allowing the workers to enter a support cage since now in the initial operating position; the platform 120 is in the proper orientation to support the workers. The workers can lock the door, secure themselves in the support cage, and wait as the telescoping pole 110 is extended up the cell tower 12.

FIG. 8 illustrates the platform 120 in the transport position (left side) and rotated to the operating position (right side) to show how equipment 140 can be located in the platform 120. The equipment 140 is placed in the platform 120 in the transport position and secured in place with a securing mechanism 142, such as straps and a winch, or the like. For example, the equipment 140 can be an antenna, metal support rods, RF equipment, or the like. The equipment 140 can be placed in the platform 120 and secured as the mobile unit 102 is in transport.

The securing mechanism 142 is configured to both hold the equipment 140 during transport and to hold the equipment as the platform 120 is moved from the transport position to the operating position. The equipment 140 can weigh over 100 lbs in some embodiments. Thus, workers enter/exit the platform 120 as shown in FIG. 7 and equipment 140 is placed in the platform as shown in FIG. 8.

In an exemplary embodiment, a telescoping platform system 100 for providing workers and/or equipment up a cell tower 12 includes a telescoping pole 110 adapted to selectively extend vertically via an extension mechanism 122; a platform 120 disposed to a top of the telescoping pole 110 and adapted to support one or more workers and/or equipment 140 for the cell tower 12; and a plurality of support connections 112 to attach the telescoping pole 110 while it is selectively extended to the cell tower 12 to provide horizontal support to the telescoping pole 110 and the platform 120.

The telescoping pole 110 can include N sections each with a length M to provide an extension of the platform to a height of about N×M, wherein N and M are selected based on the one of a bed 130 and a trailer and a desired height for the cell tower 12. The telescoping pole 110 and the platform 120 are configured in a transport position substantially horizontal and an operating position substantially vertical. The workers enter and exit the platform in an initial operating position, and the equipment 140 is placed in the platform 120 in the transport position.

The workers are secured to the platform 120 via a safety harness. The plurality of support connections 112 can include one or more of tethers, clips, straps, arms, and robotic arms. The robotic arms, clips, and arms are automatically attached to the cell tower 12 as the telescoping pole 110 is selectively extended. The clips, tethers, arms, and straps are manually attached to the cell tower by one of the workers as the telescoping pole 110 is selectively extended. The cell tower 12 can include one of a monopole tower and a guyed tower with the plurality of support connections 112 attached thereto. The telescoping platform system can further include a mobile unit 102 including one of a trailer and a bed for transporting the telescoping pole and the platform attached thereto in a transport position.

The extension mechanism 122 can be further configured to rotate the telescoping pole 110 and the platform 120 attached thereto about ninety degrees between a transport position and an operating position. The telescoping pole 110 can include a plurality of sections with a ladder 114 attached to a first section allowing the workers to enter the platform 120 once the operating position is achieved. The platform 120 can include a securing mechanism 142 to hold the equipment 140 in the transport position.

In a further exemplary embodiment, a mobile unit 102 with a telescoping platform 100 for providing workers and/or equipment up a cell tower 12 includes one of a bed 130 and a trailer; a telescoping pole 110 on the one of the bed 130 and the trailer, wherein the telescoping pole 110 is adapted to selectively extend vertically via an extension mechanism 122; a platform 120 disposed to a top of the telescoping pole 110 and adapted to support one or more workers and/or equipment 140 for the cell tower 12; and a plurality of support connections 112 to attach the telescoping pole 110 while it is selectively extended to the cell tower 12 to provide horizontal support to the telescoping pole 110 and the platform 120.

Figure 9:
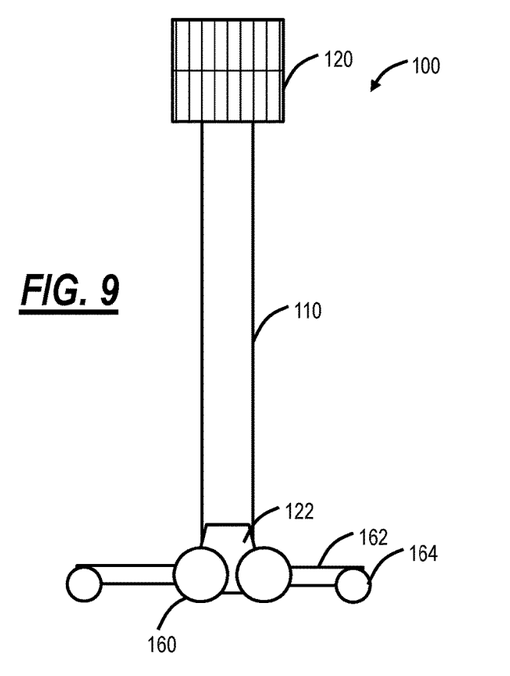
FIG. 9 is a perspective view of the telescoping platform in a mobile configuration to maneuver at the cell site.

Referring to FIG. 9, in an exemplary embodiment, a perspective view illustrates the telescoping platform 100 in a mobile configuration to maneuver at the cell site 10. Specifically, in this exemplary embodiment, the telescoping platform 100 includes wheels 160 such that the telescoping platform 100 can maneuver in tight spaces, over gravel, etc. such that it is positioned proximate to the cell tower 12. Here, the telescoping platform 100 can be brought to the cell site 10 via the mobile unit 102, offloaded and then moved to the cell tower 12.

In an exemplary embodiment, the extension mechanism 122 can include a motor or the like to drive the wheels 160. The telescoping platform 100 can be controlled via a remote, via a driver, via a mobile device, etc. In another exemplary embodiment, the telescoping platform 100 can be pulled by an All-Terrain Vehicle (ATV), a truck, etc. Of note, a crane has difficulties accessing the cell tower 12 based on current deployment practices, i.e., cell towers 12 are deployed typically around trees, with a narrow gravel ingress road, etc. The objective here is for the telescoping platform 100 to maneuver to the cell tower 12 vertically. It is expected that it would be difficult to bring a large truck to the cell tower 12 as well as associated risks.

The telescoping platform 100 can also include stabilizing arms 162 and wheels 164 that can be selectively extended or removed to provide stabilization as the telescoping platform 100 is maneuvered to the cell tower 12. The stabilizing arms 162 and wheels 164 ensure the telescoping platform 100 does not topple over as it stands vertically during maneuvering. The stabilizing arms 162 and wheels 164 can be stored or removed in the transport position.

In another exemplary embodiment, the telescoping platform 100 can have the wheels on the telescoping pole 110 allowing the telescoping platform 100 to maneuver in the transport position, i.e., the telescoping pole 110 is horizontal. Here, the extension mechanism 122 can rotate the telescoping pole 110 once the telescoping platform is in the desired position. The wheels on the telescoping pole 110 can be removed or remain in place in the operating position.

§ 3.0 Telescoping Platform Method

Figure 10:
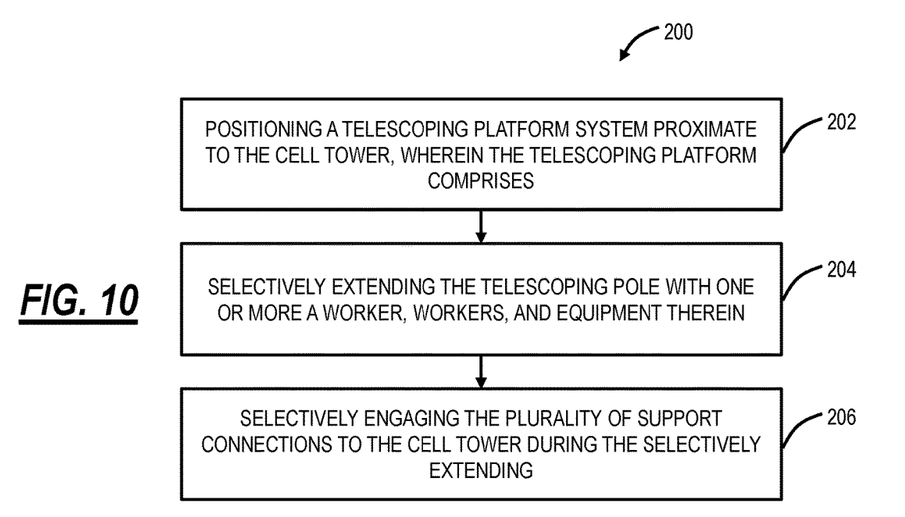
FIG. 10 is a flowchart of a method for performing operations on a cell tower with a telescoping platform.

Referring to FIG. 10, in an exemplary embodiment, a flowchart illustrates a method 200 for performing operations on a cell tower 12 with a telescoping platform 100. The method 200 includes positioning a telescoping platform system proximate to the cell tower (step 202). The telescoping platform includes a telescoping pole 110 adapted to selectively extend vertically via an extension mechanism 122; a platform 120 disposed to a top of the telescoping pole 110 and adapted to support one or more workers and/or equipment 140 for the cell tower 12; and a plurality of support connections 112 to attach the telescoping pole 110 while it is selectively extended to the cell tower 12 to provide horizontal support to the telescoping pole 110 and the platform 120. The method 200 further includes selectively extending the telescoping pole with one or more a worker, workers, and equipment therein (step 204); and selectively engaging the plurality of support connections to the cell tower during the selectively extending (step 206).

§ 4.0 Installation and Maintenance of Equipment on Cell Towers with Robotic Devices Referring to FIGS. 11A-11C, in various exemplary embodiments, diagrams illustrate different types of cell towers 12, namely a self-support tower 12A (FIG. 11A), a monopole tower 12B (FIG. 11B), and a guyed tower 12C (FIG. 11C). These three types of towers 12A, 12B, 12C have different support mechanisms. The self-support tower 12A can also be referred to as a lattice tower, and it is free standing, with a triangular base with three or four sides. The monopole tower 12B is a single tube tower, and it is also free standing, but typically at a lower height than the self-support tower 12A. The guyed tower 12C is a straight rod supported by wires attached to the ground.

Figure 12:
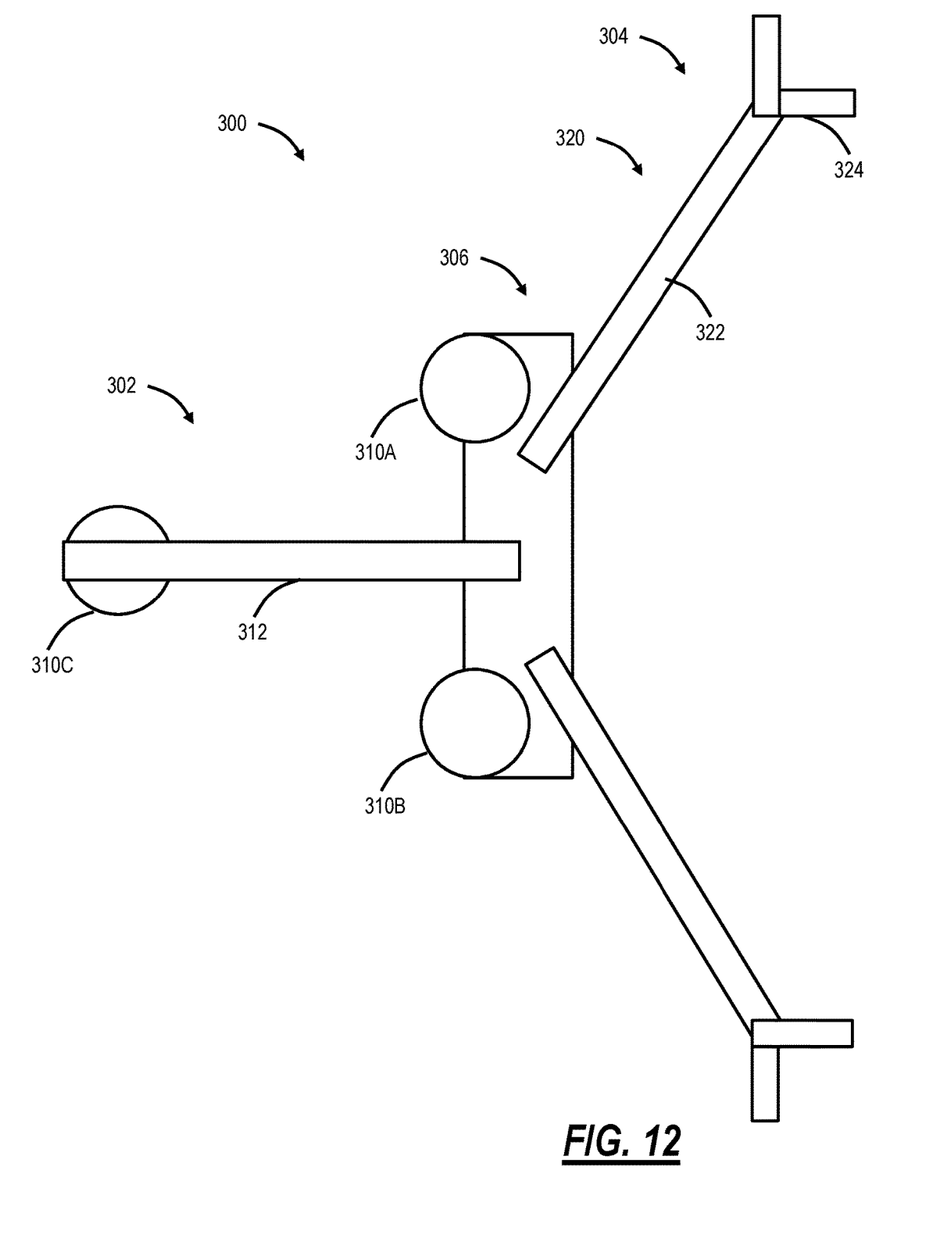
FIG. 12 is a block diagram illustrates a robotic device configured for use with the cell towers for installation and/or maintenance of cell site components on the cell towers.

Referring to FIG. 12, in an exemplary embodiment, a block diagram illustrates a robotic device 300 configured for use with the cell towers 12A, 12B, 12C for installation and/or maintenance of cell site components 14 on the cell towers 12A, 12B, 12C. The robotic device 300 is configured to traverse up and down the cell tower 12 with climbing components 302 and to perform physical manipulation of equipment, cabling, etc. with manipulation components 304. In addition to the climbing components 302 and the manipulation components 304, the robotic device 300 includes a body 306 which may include power, physical support for the climbing components 302 and the manipulation components 304, processing (e.g., the robotic device 300 can include a mobile device or equivalent disposed or associated with the body 306).

Thus, the robotic device 300 reduces or avoids tower climbs for installation and maintenance of equipment on the cell towers 12. The robotic device 300 can crawl to the top of the cell tower 12, can be delivered by Unmanned Aerial Vehicles (UAV), can be delivered by the guide wire, can be delivered by a crane, pulley, etc. or the like. While on the cell tower 12, the robotic devices 300 can be used, either manually, autonomously, or a combination of both, to perform various tasks on cell tower components 14 such as antennas or the like. In an exemplary embodiment, the robotic device 300 can be used to bring cabling up the cell tower 12 in conjunction with UAV-based systems and methods which install equipment such as antennas.

The climbing components 302 are configured to allow the robotic device 300 to traverse up and down the cell tower 12. Those of ordinary skill in the art will recognize the robotic device 300 can include any mechanism for climbing, but in an exemplary embodiment, the climbing components 302 can include various wheels 310. For example, to traverse the self-support tower 12A, the monopole tower 12B, the guyed tower 12C, etc., wheels 310A, 310B are on the body 306 to roll up or down the tower 12 while a wheel 310C is spaced apart from the body 306 via a member 312 to keep the robotic device 300 affixed to the tower 12 during transit. Also, this arrangement of the climbing components 302 could be used with a guide wire to traverse up and down the cell tower 12.

The manipulation components 304 can include one or more robotic arms 320 which can include a member 322 which is rotatable or moveable relative to the body 306 and a grasping device 324 which can physically interact and/or manipulate with the cell site components 14. The robotic device 300 can include multiple arms 320 in some embodiments and a single arm 320 in another embodiment.

In another exemplary embodiment, the climbing components 302 can be the same as the manipulation components 120, such as when there is more than one robotic arm 320. Here, the robotic arms 320 can be used to both install/manipulate the cell site components 14 as well as to climb the cell tower 12. For example, the robotic arms 320 can grasp stairs on the cell tower 12, supports on a lattice tower, safety climb wires, or the like.

The climbing components 302 may also include magnets including selectively enabled magnets. Note, the cell towers 12 include metal, and the magnets could be used to traverse up and down the cell tower 12.

Thus, in operation, the climbing components 302 are used to traverse up and down the cell tower as well as to maintain the robotic device 300 in a stable position at a desired location on the cell tower 12. Once at the desired location, the manipulation components 304 are used to perform installation and/or maintenance. For example, the manipulation components 304 can be controlled with a mobile device or controller which is wirelessly connected to the robotic device 300, through a Heads Up Display (HUD) or Virtual Reality (VR) controller which is wirelessly connected to the robotic device 300, or the like. With the HUD or VR controller, an operator can remotely operate the robotic device 300, from the ground, thereby having arms in the sky without the tower climb.

The manipulation components 304 can be used to perform similar functionality as robotic arms, including bringing the payload up the cell tower 12. In an exemplary embodiment, the manipulation components 304 can be used to bring cabling up the cell tower 12, such as in conjunction with a UAV-based installation method.

In an exemplary embodiment, a plurality of robotic devices 300 can be used in combination. For example, the plurality of robotic devices 300 can combine with one another at the desired location to form an aggregate robotic device.

Figure 13:
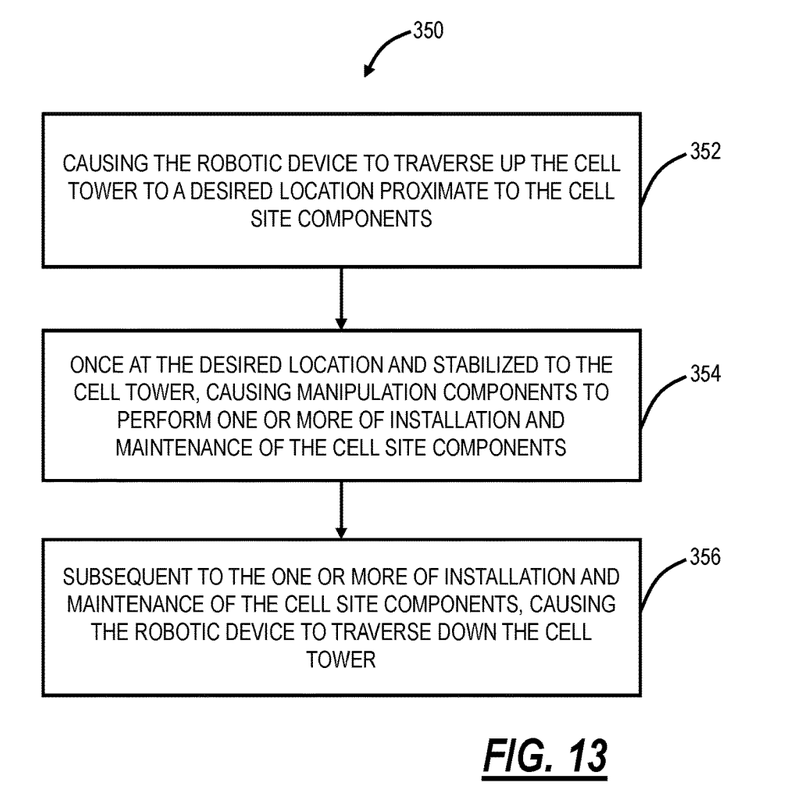
FIG. 13 is a flowchart of a method for installation and maintenance of cell site components with the robotic device.

Referring to FIG. 13, in an exemplary embodiment, a flowchart illustrates a method 350 for installation and maintenance of cell site components with the robotic device 300. The method 350 includes causing the robotic device to traverse up the cell tower to the desired location proximate to the cell site components (step 352); once at the desired location and stabilized to the cell tower, causing manipulation components to perform one or more of installation and maintenance of the cell site components (step 354); and, subsequent to the one or more of installation and maintenance of the cell site components, causing the robotic device to traverse down the cell tower (step 356).

The robotic device traverses up and down the cell tower via climbing components associated with the robotic device. The climbing components can include a plurality of wheels configured to traverse the cell tower and stabilize the robotic device to the cell tower; a plurality of magnets; and a pulley system. The cell tower can include one of a self-support tower, a monopole tower, and a guyed tower, and climbing components for the robotic device are configured based on a type of the cell tower.

The manipulation components can include one or more members with robotic arms coupled thereto. The robotic device can include a body comprising a processor and wireless components; climbing components disposed to the body; and the manipulation components movably disposed to the body.

The causing can be performed by one of a mobile device and a controller wirelessly coupled to the robotic device. The causing can be performed by one of a Heads Up Display and a Virtual Reality controller wirelessly coupled to the robotic device. The robotic device can be utilized to bring a cable up the cell tower and to connect the cable to the cell site components. The cell site components can be installed by an Unmanned Aerial Vehicle (UAV).

In another exemplary embodiment, an apparatus for installation and maintenance of cell site components on a cell tower with a robotic device includes a wireless interface; a processor communicatively coupled to the wireless interface; and memory storing instructions that, when executed, cause the processor to cause the robotic device to traverse up the cell tower to the desired location proximate to the cell site components; once at the desired location and stabilized to the cell tower, cause manipulation components to perform one or more of installation and maintenance of the cell site components; and, subsequent to the one or more of installation and maintenance of the cell site components, cause the robotic device to traverse down the cell tower.

§ 5.0 Mechanical Tower Climber

The robotic device 300 can be a mechanical tower climber system that scales the cell tower 12 for performing maintenance work, site inspection, site audit, etc. Since the robotic device 300 can traverse the cell tower 12 in lieu of a manual tower climb, the mechanical tower climber system provides a safer solution addressing the aforementioned safety concerns related to manual tower climbs.

The robotic device 300 can be configured to fit and climb all types of cell towers 12, e.g., the self-support tower 12A, the monopole tower 12B, and the guyed tower 12C. As illustrated in FIG. 12, the robotic device 300 can include the wheels 310A, 310B are on the body 306 to roll up or down the tower 12 while a wheel 310C is spaced apart from the body 306 via a member 312 to keep the robotic device 300 affixed to the tower 12 during transit. In this manner, the robotic device 300 can climb the cell tower 12 by rolling the wheels up the physical structure.

Other climbing embodiments are also contemplated. For example, the robotic device 300 could include legs with grips that mimic human climbing. Here, the robotic device 300 can climb steps 54 on the cell tower 12 as a person would. Also, the legs could extend and be larger than a person's legs allowing the robotic device 300 to climb the support structure such as in the self-support tower 12A. The robotic device 300 can include a plurality of members 322, each enabling climbing as well as manipulation of objects.

Also, the cell tower 12 can include safety climb wires which are used for human climbers to clip in for safety. The robotic device 300 can utilize the same safety climbing techniques as humans. Also, the robotic device 300 can be tethered to the cell tower 12 and/or associated safety devices.

Figure 14:
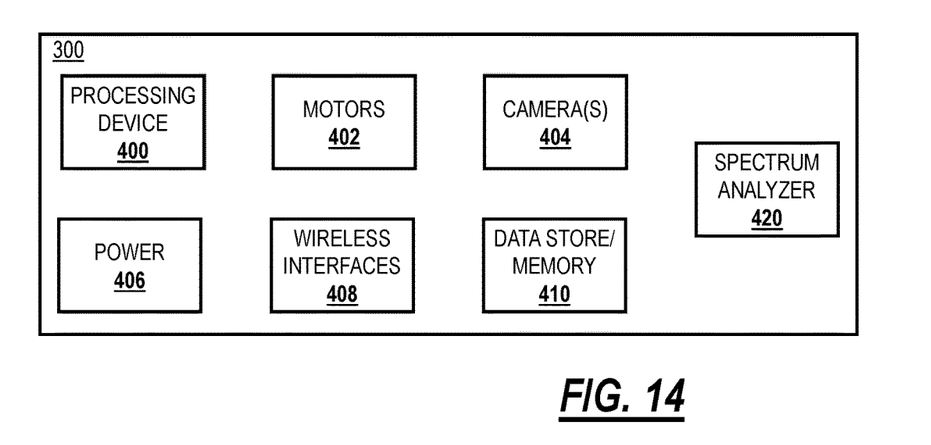
FIG. 14 is a block diagram illustrates functional components of the robotic device of FIG. 12 as a mechanical tower climber system.

Referring to FIG. 14, in an exemplary embodiment, a block diagram illustrates functional components of the robotic device 300 as a mechanical tower climber system. The robotic device 300 can include a processing device 400, motors 402, cameras 404, power 406, wireless interfaces 408, a data store/memory 410, and a spectrum analyzer 420. These components can be integrated with, disposed on, associated with the body 306. The processing device 400 can be similar to a mobile device. Generally, the processing device 400 can be configured to control operations of the motors 402, the cameras 404, the power 406, the wireless interfaces 408, and the data store/memory 410.

The motors 402 control physical movement of various components in the robotic device 300 including the members 322, the wheels 310, etc. This control can be based on commands from a remote operator communicating to the robotic device 300 such as via the wireless interfaces 408 processed by the processing device 400. The motors 402 are also connected to the power 406.

The cameras 404 can be disposed on or about the body 306. The robotic device 300 can include one or more cameras 404, for example, facing different directions as well as supporting pan, tilt, zoom, etc. Generally, the cameras 404 are configured to obtain images and video, including high definition, as well as provide a real-time feed to the remote operator via the wireless interfaces 408. The cameras 404 are configured to provide the images or video to the processing device 400 and/or the data store/memory 410. The cameras 404 can include a First-Person View (FPV) camera for easy navigation and focused work. The cameras 404 can also include a 360-degree camera to monitor surroundings so other equipment is not damaged and better movements can be made.

The power 306 can be onboard batteries or a battery pack, that is rechargeable. The wireless interfaces 408 can support wireless communication such as via Wi-Fi, LTE, Bluetooth, and/or proprietary protocols. The wireless interfaces 408 can communicate to a user device (mobile phone, tablet, laptop, Heads Up Display (HUD), Virtual Reality (VR) headset, or the like associated with the remote operator. The data store/memory 410 can be an onboard memory for data storage.

The spectrum analyzer 420 is configured to measure wireless performance. The spectrum analyzer 420 can be incorporated in the robotic device 300, attached thereto, etc. The spectrum analyzer 420 is communicatively coupled to the processing device 400. The spectrum analyzer 420 can be configured to detect signal bandwidth, frequency, and Radio Frequency (RF) strength.

The control of the robotic device 300 can be through various techniques including an app on a mobile device, VR headset, HUD display, tactile gloves, and the like. Specifically, the robotic device 300 can receive gesture-based inputs from a human operator. For example, when the operator moves a hand, the corresponding member 322 on the robotic device 300 moves in the same manner, i.e., the robotic device 300 can mirror movements of its operator. Thus, the members 322 can be used to climb the cell tower 12 as well as to perform torquing tasks on the cell tower 12 and with the cell site components 14.

The members 322 can include robotic hands, such as with five fingers for performing various tasks. The robotic hands can also be configured with rotating tools at different digits to perform work no-matter what tool is needed. The members 322 can also telescope, i.e., extend/retract, a certain distance. The robotic device 300 can be attached to the cell tower 12 while one of the members 322 moves to maintain stability.

Also, various components of the robotic device 300 can include magnets, including selectively engageable magnets to maintain balance and stability on the cell tower 12.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A mechanical tower climber system for performing operations on a cell tower, the mechanical tower climber system comprising:
   a body;
   a plurality of robotic arms connected to the body and being rotatable or moveable with respect to the body, each of the robotic arms comprising one or more robotic hands, each of the robotic hands comprising a plurality of robotic digits that mimic human fingers;
   a wireless interface configured to receive commands from a remote operator; and
   a processing device configured to control actions of the body, robotic arms, robotic hands, and robotic digits based on the commands to enable the body, robotic arms, robotic hands, and robotic digits to climb the cell tower install and/or manipulate cell site components associated with the cell tower.

2. The mechanical tower climber system of claim 1, further comprising:
   one or more wheels configured to move up and down the cell tower.

3. The mechanical tower climber system of claim 1, wherein the cell tower comprises one of a monopole tower, a self-support tower, and a guyed tower.

4. The mechanical tower climber system of claim 1, wherein the plurality of robotic arms are configured to mimic a human or spider to climb the cell tower.

5. The mechanical tower climber system of claim 1, further comprising:
   a safety clip configured to clip onto safety wires on the cell tower.

6. The mechanical tower climber system of claim 1, further comprising:
   one or more cameras is electrically connected to the processing device and configured to provide a real-time feed to the remote operator.

7. The mechanical tower climber system of claim 1, wherein the robotic hands are configured to perform torquing tasks on the cell tower.

8. The mechanical tower climber system of claim 1, further comprising:
   a spectrum analyzer configured to perform Radio Frequency (RF) measurements.

9. The mechanical tower climber system of claim 1, wherein one or more of the robotic digits have tools integrated therein.

10. The mechanical tower climber system of claim 1, wherein the remote operator controls the mechanical tower climber system via commands sent to the wireless interface from sensory gloves.

11. The mechanical tower climber system of claim 1, wherein the plurality of robotic arms are configured to retract and expand.

12. The mechanical tower climber system of claim 1, further comprising:
   one or more selectively engageable magnets disposed on the body and/or the plurality of robotic arms.

13. A mechanical tower climber method for performing operations on a cell tower, the mechanical tower climber method comprising:
   providing a body;
   providing a plurality of robotic arms connected to the body and being rotatable or moveable with respect to the body, each of the robotic arms comprising one or more robotic hands, each of the robotic hands comprising a plurality of robotic digits configurated to mimic human fingers;
   providing a wireless interface configured to receive commands from a remote operator; and
   providing a processing device configured to control actions of the body, robotic arms, robotic hands, and robotic digits based on the commands to enable the body, robotic arms, robotic hands, and robotic digits to climb the cell tower and perform one or more operations on cell site components associated with the cell tower.

* * * * *